United States Patent [19]

Stenzel

[11] 3,985,683

[45] Oct. 12, 1976

[54] CATALYST FOR REDUCING THE TOXIC CONTAMINANTS OF COMBUSTION ENGINE EXHAUST GAS

[75] Inventor: Jürgen Stenzel, Erftstadt Liblar, Germany

[73] Assignee: Hoechst Aktiengesellschaft, Frankfurt am Main, Germany

[22] Filed: Mar. 6, 1975

[21] Appl. No.: 555,879

Related U.S. Application Data

[63] Continuation-in-part of Ser. No. 525,181, Nov. 19, 1974, abandoned.

[30] Foreign Application Priority Data

Nov. 24, 1973 Germany............................ 2358664

[52] U.S. Cl. ........................... 252/466 J; 423/213.2
[51] Int. Cl.² ..................... B01J 21/04; B01J 23/84
[58] Field of Search .................... 252/466 J, 477 R; 423/213.2

[56] References Cited

UNITED STATES PATENTS 3,839,224  10/1974  Yonehara et al. ............... 252/477 R

FOREIGN PATENTS OR APPLICATIONS 2,165,550  7/1973  Germany ........................ 423/213.2

Primary Examiner—W. J. Shine
Attorney, Agent, or Firm—Connolly and Hutz

[57] ABSTRACT

Catalyst reducing the toxic contaminants of exhaust gas of combustion engines. The catalyst, which consists essentially of a ceramic honey comb structure as carrier and a mixture of copper, nickel and manganese oxides as catalytically active ingredients, has an intermediary layer of aluminum oxide applied to the honey comb carrier.

The catalyst is produced by heating the honey comb carrier to 300° – 400°C; by introducing the hot carrier into a concentrated solution of an aluminum salt of a volatile acid for 15 – 60 minutes; by blowing out the carrier and drying it at room temperature; by heating the dry carrier within 1 to 4 hours to 350° – 450°C and then calcining it for 2 to 6 hours to 500° – 700°C with the resultant formation of an intermediary layer of aluminum oxide on the honey comb carrier; by heating the carrier to 300° – 400°C; by dipping the hot carrier in a hot concentrated aqueous solution of catalytically active copper, nickel and manganese salts of volatile acids and allowing it to remain therein for 15 – 60 minutes; by blowing out the carrier and drying it for 1 – 4 hours at 350° – 450°C; and by calcining it for 5 – 20 hours at 700° – 1000°C.

9 Claims, No Drawings

CATALYST FOR REDUCING THE TOXIC CONTAMINANTS OF COMBUSTION ENGINE EXHAUST GAS

This application is a continuation-in-part of application Ser. No. 525,181 filed Nov. 19, 1974, and now abandoned.

The present invention relates to a catalyst reducing the toxic contaminants of combustion engine exhaust gases, and to a process for making it.

It is known (cf. German Patent Specification Offenlegungsschrift 2,165,550) that the exhaust gas of combustion engines can be decontaminated with the use of catalysts containing copper, manganese and nickel oxides as their active ingredients, which are deposited on a filler carrier. In an attempt to reduce the decrease of pressure, which occurs upon the passage of exhaust gas through the catalyst, and in view of the high ratio of catalyst surface area to catalyst weight, it has been proposed in German Patent Specifications 1,097,344 and 1,187,535 to deposit the above metal oxides on honey comb carriers. Copper, manganese and nickel oxides, which are deposited thereon, are, however, considerably less active catalytically than an identical oxide combination which is deposited on a filler carrier.

It is accordingly an object of the present invention to provide a catalyst, wherein oxides of copper, manganese and nickel are applied on to a honey comb carrier of ceramic material so as to remain fully active catalytically. The term "ceramic material" as used herein means more particularly alumina or cordierite (2 MgO . 2 $Al_2O_3$ . 5 $SiO_2$) or mullite (3 $Al_2O_3$ . 2 $SiO_2$) or mixtures thereof, for example. To this end, the invention provides for an intermediary layer of aluminum oxide to be applied on to the honey comb carrier, prior to impregnating it with the catalytically active ingredients.

It is more particularly possible for the intermediary layer of aluminum oxide to be used in a proportion within the range 5 and 15 weight%, based on the catalyst.

The process of the present invention for making the catalyst comprises: heating the honey comb carrier to temperatures within the range 300° and 400° C; introducing the hot carrier into a concentrated solution of an aluminum salt of a volatile acid for a period within the range 15 and 60 minutes; blowing out the carrier and drying it at room temperature; heating the dry carrier for a period within the range 1 and 4 hours to temperatures within the range 350° and 450° C and then calcining it for a period within the range 2 and 6 hours to temperatures within the range 500° and 700° C with the resultant formation of an intermediary layer of aluminum oxide on the honey comb carrier; heating the carrier to temperatures within the range 300° and 400° C; dipping the hot carrier in a hot concentrated aqueous solution of catalytically active copper, nickel and manganese salts of volatile acids and allowing it to remain therein for a period within the range 15 and 60 minutes; blowing out the carrier and drying it for a period within the range 1 and 4 hours at temperatures within the range 350° and 450° C; and calcining it for a period within the range 5 and 20 hours at temperatures within the range 700° and 1000° C. The aqueous solution may contain the catalytically active copper, nickel and manganese salts in a ratio by weight of 0.1 to 1 : 0.1 to 1 : 0.1 to 1.

Further preferred features of the process of the present invention provide:

a. for the honey comb carrier having the intermediary layer and the catalytically active ingredients thereon to be heated for a period within the range 1 and 3 hours to temperatures within the range 400° and 500° C, in a slightly reducing atmosphere;

b. for the honey comb carrier to be heated in a hydrogen/nitrogen mixture containing approximately 5% of hydrogen;

c. for aluminum nitrate to be used as the aluminum salt;

d. for aluminum hydroxychloride to be used as the aluminun salt;

e. for nitrates to be used as the copper, nickel and manganese salts; and f. for the aqueous solution to contain Cu and Ni and Mn in a ratio by weight of 1:1:1.

For an identical molar ratio of identical catalytically active ingredients, the catalyst of the present invention reduces the contaminants in exhaust gases, namely, nitrogen oxides and especially carbon monoxide and hydrocarbons, to be converted more effectively, and the decrease of pressure to be kept at a lower rate, than with the use of a filler catalyst.

The following Examples illustrate the invention. Example 1 describes the preparation of a filler catalyst and Example 2 describes the preparation of a conventional honey comb catalyst. Examples 3 and 4 and 6 to 8 describe the preparation of the honey comb catalyst of the present invention. In the following Examples 1 to 5, oxides of copper, nickel and manganese were used as the catalytically active catalyst ingredients, in a ratio by weight of Cu:Ni:Mn of 1:1:1. The gas tested in each of the Examples consisted of 20,000 ppm of CO, 250 ppm of n-hexane, 1,000 ppm of $NO_x$, 0.5% by volume of $O_2$, 2.5% by volume of $H_2O$, the balance being $N_2$.

EXAMPLE 1

Prior art catalyst.

Pellets 5 mm in diameter having a strength of 12 to 15 kg per pellet and a specific surface area of approximately 2 $m^2$/g (determined by the method of Brunauer, Emmet and Teller described in J.Am.Chem.-Soc.60(1938)p.309) were used as the carrier. The pellets were made by granulating a blend of $\alpha$-Al(OH)$_3$ (Martifin, a product of Martinswerke AG., Bergheim) with approximately 5 weight % of bentonite A (a product of Erbslöh, Geisenheim) on a rotating inclined table, and by drying and calcining the resulting spheroidal granules for 17 hours at 1420° C.

The pellets were heated to 350° C and impregnated over a period of 30 minutes with a hot concentrated aqueous solution of copper, nickel and manganese nitrates. The solution in excess was removed, the impregnated pellets were dried and heated within 3 hours from 200° to 450° C so as to effect decomposition of the nitrates.

The filler catalyst so made was aged artificially by heating it for 17 hours to 900° C in air and activated by 4-hour treatment at 450° C with a mixture of 95% by volume of $N_2$ and 5% by volume of $H_2$.

The filler catalyst was contacted for 10 hours at 500° C with the test gas, then cooled and tested while flowing the test gas thereover at a spatial velocity of 24,000 liter of gas per liter of catalyst per hour. The following conversion rates were obtained:

| Catalyst bed | Conversion in % | | |
|---|---|---|---|
| temp. in °C | CO | n-Hexane | NO$_x$ |
| 225 | 21 | — | 1 |
| 250 | 28 | — | 20 |
| 260 | 36 | — | 50 |
| 275 | 43 | 8 | 70 |
| 300 | 60 | 12 | 80 |
| 325 | 75 | 15 | 90 |

The ceramic honey comb carriers used in the following Examples 2 to 8 are commercially available from American Lava Corp., a subsidiary of 3M Company, Chattanooga, Tenn. 37405. They are manufactured after American Lava patent (U.S. Pat. No. 3,444,925) with cordierite as primary constituent.
Brand name: AlSi Mag 795

Physical data:
Porosity  80 % greater than 10 microns pore diameter
          50 % greater than 30 microns pore diameter
          20 % greater than 90 microns pore diameter
          10 % greater than 100 microns pore diameter Surface area (BET surface) smaller than 0.1 m²/g. Constitution of the honey comb: 12 corrugations per inch; wall thickness 0.006 inch.

EXAMPLE 2

Prior art catalyst.

A honey comb carrier 24 mm in diameter and 77 mm long, which consisted substantially of cordierite (2 MgO . Al$_2$O$_3$ . 5 SiO$_2$) was heated to 350° C, impregnated with the catalytically active nitrates, which were decomposed, in the manner described in Example 1. The honey comb catalyst so made was aged artificially by heating it for 17 hours to 800° C in air, and activated by 2-hour treatment at 450° C with a mixture of 95% by volume of N$_2$ and 5% by volume of H$_2$.

The honey comb catalyst so made contained 18 weight % of metal oxide mixture on 82 weight % of carrier.

It was tested in the manner described in Example 1 and the following results were obtained.

| Catalyst bed | Conversion in % | | |
|---|---|---|---|
| temp. in °C | CO | n-Hexane | NO$_x$ |
| 205 | 12 | — | 10 |
| 240 | 22 | — | 33 |
| 300 | 48 | — | 44 |
| 360 | 74 | 6 | 67 |
| 385 | 85 | 13 | 89 |
| 425 | 94 | 28 | 95 |

EXAMPLE 3

Catalyst of invention.

A honey comb carrier 24 mm in diameter and 77 mm long, which consisted substantially of cordierite (2MgO . Al$_2$O$_3$ . 5 SiO$_2$) was heated to 350° C, dipped in a hot 50% aqueous aluminum nitrate solution and allowed to remain therein for 30 minutes. After having been blown out and dried, the honey comb carrier was heated over a period of 3 hours from 200° to 450° C to effect decomposition of the nitrate and maintained for 5 hours at 500° C.

The honey comb carrier so treated was impregnated with the catalytically active components, aged and activated in the manner described in Example 2.

The resulting honey comb catalyst contained 17 weight % of metal oxide mixture and 8 weight % of aluminum oxide on 75 weight % of carrier.

It was tested in the manner described in Example 1 and the following results were obtained.

| Catalyst bed | Conversion in % | | |
|---|---|---|---|
| temp. in °C | CO | n-Hexane | NO$_x$ |
| 130 | 5 | — | 0 |
| 150 | 10 | — | 10 |
| 157 | 16 | — | 20 |
| 180 | 38 | — | 50 |
| 235 | 72 | 9 | 80 |
| 300 | 95 | 22 | 90 |
| 320 | 98 | 29 | 95 |

EXAMPLE 4

Catalyst of invention.

A honey comb carrier 100 mm in diameter and 77 mm long, which consisted substantially of cordierite was heated to 350° C, dipped in a hot 34% aqueous solution of aluminum hydroxychloride (Al$_2$(OH$_5$)Cl) and allowed to remain therein for 30 minutes. After having been blown out and dried, the honey comb carrier was heated within 3 hours to 450° C and calcined for a further 5 hours at 700° C.

The catalyst so made was aged and activated in the manner described in Example 2.

It contained 18 weight % of metal oxide mixture and 8 weight % of aluminum oxide on 74 weight % of carrier.

It was tested in the manner described in Example 1 and the following results were obtained.

a. After 10-hour contact with the test gas at 500° C:

| Catalyst bed | Conversion in % | | |
|---|---|---|---|
| Temp. in °C | CO | n-Hexane | NO$_x$ |
| 160 | 2 | — | 0 |
| 175 | 8 | — | 10 |
| 240 | 62 | 7 | 50 |
| 320 | 93 | 20 | 90 |
| 380 | 98 | 32 | 100 | b. After 110-hour contact with the test gas at 600° C:

| Catalyst bed | Conversion in % | | |
|---|---|---|---|
| temp. in °C | CO | n-Hexane | NO$_x$ |
| 175 | 5 | — | 0 |
| 190 | 11 | — | 10 |
| 265 | 66 | 8 | 50 |
| 365 | 95 | 23 | 90 |
| 425 | 98 | 32 | 100 |

EXAMPLE 5

Four honey comb catalysts prepared as described in Example 4 were tested in a motor endurance test on a four cylinder engine (VW 1600) placed in a test stand and provided with an adjustable electronic fuel injector, revolution counter and fluid friction dynamometer. Two reactors, each of which had two series-connected honey comb catalysts therein, were positioned in the off-gas outlet of the engine. Secondary air was supplied at a place between the two reactors. The following results were obtained at a speed of 3250 rpm and 25 hp.

| Catalyst bed temp. in (°C) | Sec. air m³/h | Exhaust gas coming from motor ||| Exhaust gas downstream of catalyst ||| Conversion in % |||
|---|---|---|---|---|---|---|---|---|---|---|
| | | Vol%-CO | ppm n-Hexane | ppm NO$_x$ | Vol%-CO | ppm n-Hexane | ppm NO$_x$ | CO | n-Hexane | NO$_x$ |
| 660 | 3.9 | 1.5 | 260 | 2680 | 0.54 | 120 | 60 | 64 | 54 | 97.8 |
| 670 | 5.2 | 1.5 | 260 | 2640 | 0.30 | 91 | 80 | 80 | 65 | 97.0 |
| 680 | 6.5 | 1.5 | 260 | 2640 | 0.10 | 55 | 120 | 93.3 | 80.8 | 95.5 |
| 680 | 7.1 | 1.5 | 260 | 2640 | 0.02 | 31 | 800 | 98.7 | 88.0 | 68 |
| 680 | 7.8 | 1.5 | 260 | 2600 | 0.02 | 30 | >1000 | 98.7 | 88.5 | <60 |

EXAMPLE 6

A honey comb carrier provided with an aluminium oxide layer in the manner described in Example 3 was heated to 350° C and impregnated for 30 minutes with an aqueous, concentrated and hot solution containing copper, nickel and manganese nitrates in a quantitative ratio of Cu: Ni:Mn = 0.1:1:1. The solution in excess was removed by centrifugation, the impregnated honey comb carrier was dried and heated within 3 hours from 200° to 450° C to effect decomposition of the nitrates. The resulting honey comb catalyst was aged artificially by heating it for 17 hours at 800° C in the open air, and activated by 2 hour-treatment at 450° C with a blend of 95% by volume of N$_2$ and 5% by volume of H$_2$.

The honey comb catalyst so made contained:
15 weight % of metal oxide mixture and
8 weight % of aluminum oxide on
77 weight % of carrier material.

The catalyst was tested as described in Example 1 and the following results were obtained:

| Catalyst bed temp. °C | Conversion in % |||
|---|---|---|---|
| | CO | n-Hexane | NO$_x$ |
| 240 | 19 | — | 2 |
| 260 | 26 | — | 10 |
| 282 | 36 | — | 30 |
| 309 | 48 | — | 50 |
| 342 | 65 | — | 70 |
| 382 | 83 | — | 85 |
| 414 | 90 | — | 90 |

EXAMPLE 7

The procedure was the same as that described in Example 6 save that the carrier was impregnated with a hot concentrated and aqueous solution containing copper, nickel and manganese nitrates in a quantitative ratio of Cu:Ni:Mn = 1:0.1:1.

The resulting catalyst contained
14.5 weight % of metal oxide mixture and
8 weight % of aluminum oxide on
77.5 weight % of carrier material.

The honey comb catalyst was tested as described in Example 1 and the following results were obtained:

| Catalyst bed temp. °C | Conversion in % |||
|---|---|---|---|
| | CO | n-Hexane | NO$_x$ |
| 213 | 11 | — | 3 |
| 226 | 15 | — | 10 |
| 255 | 22 | — | 30 |
| 272 | 44 | — | 50 |
| 315 | 72 | — | 70 |
| 339 | 85 | — | 80 |
| 372 | 92 | 2 | 90 |

| Catalyst bed temp. °C | Conversion in % |||
|---|---|---|---|
| | CO | n-Hexane | NO$_x$ |
| 405 | 94 | 7 | 95 |

EXAMPLE 8

The procedure was the same as that described in Example 6 save that the carrier was impregnated with a hot concentrated and aqueous solution containing copper, nickel and manganese nitrates in a quantitative ratio of Cu:Ni:Mn = 1:1:0.1.

The resulting catalyst contained
14 weight % of metal oxide mixture and
8 weight % of aluminum oxide on
78 weight % of carrier material.

The honey comb catalyst was tested as described in Example 1 and the following results were obtained:

| Catalyst bed temp. °C | Conversion in % |||
|---|---|---|---|
| | CO | n-Hexane | CO$_x$ |
| 165 | 7 | — | 3 |
| 193 | 21 | — | 10 |
| 242 | 47 | — | 30 |
| 265 | 63 | — | 45 |
| 294 | 78 | — | 65 |
| 329 | 87 | 6 | 85 |
| 350 | 92 | 12 | 93 |
| 400 | 96 | 24 | 96 |

I claim:
1. A process for making a catalyst reducing the toxic contaminants of combustion engine exhaust gases, which comprises: heating the honey comb carrier to temperatures within the range 300° and 400° C; introducing the hot carrier into a concentrated solution of an aluminum salt of a volatile acid for a period within the range 15 and 60 minutes; expelling excess liquid from the honey comb carrier and drying it at room temperature; heating the dry carrier for a period within the range 1 and 4 hours to temperatures within the range 350° and 450° C and then calcining it for a period within the range 2 and 6 hours at temperatures within the range 500° and 700° C with the resultant formation of an intermediary layer of aluminum oxide on the honey comb carrier; heating the carrier to temperatures within the range 300° and 400° C; dipping the hot carrier in a hot concentrated aqueous solution of catalytically active copper, nickel and manganese salts of volatile acids and allowing it to remain therein for a period within the range 15 and 60 minutes; expelling excess liquid from the honey comb carrier and drying it for a period within the range 1 and 4 hours at temperatures within the range 350° and 450° C; and calcining it for a period within the range 5 and 20 hours at temperatures within the range 700° and 1000° C.

2. The process as claimed in claim 1, wherein the honey comb carrier having the intermediary layer and the catalytically active ingredients deposited thereon is heated for a period within the range 1 and 3 hours to temperatures within the range 400° C and 500° C, in a slightly reducing atmosphere.

3. The process as claimed in claim 2, wherein the honey comb carrier is heated in an hydrogen/nitrogen mixture containing approximately 5% of hydrogen.

4. The process as claimed in claim 1, wherein aluminum nitrate is used as the aluminum salt.

5. The process as claimed in claim 1, wherein aluminum hydroxychloride is used as the aluminum salt.

6. The process as claimed in claim 1, wherein nitrates are used as the copper, nickel and manganese salts.

7. The process as claimed in claim 1, wherein the aqueous solution contains said catalytically active copper, nickel and manganese salts of volatile acids in a ratio by weight of 0.1 to 1 : 0.1 to 1 : 0.1 to 1.

8. The process as claimed in claim 7, wherein the ratio by weight is 1:1:1.

9. Catalyst for reducing the toxic contaminants in the exhaust gas of combustion engines, the catalyst having been prepared by a process comprising heating a honey comb structure of ceramic material to temperatures within the range 300° to 400° C; introducing the honey comb structure into a concentrated solution of an aluminum salt of a volatile acid and allowing it to remain therein for a period within the range 15 to 60 minutes; blowing out the honey comb structure and drying it at room temperature; heating the dried honey comb structure over a period within the range 1 to 4 hours to temperatures within the range 350° to 450° C and then calcining it for a period within the range 2 to 6 hours at temperatures within the range 500° to 700° C with the resultant formation, on said honey comb structure, of an intermediary layer of aluminum oxide constituting between 5 and 15% of the total weight of the final catalyst; heating the honey comb structure so treated to temperatures within the range 300° and 400° C and dipping it in a hot concentrated solution of copper, nickel and manganese salts of volatile acids so as to impregnate the honey comb structure therewith; blowing out, drying and heating the honey comb structure to temperatures within the range 350° to 450° C and calcining it for a period within the range 5 to 20 hours at temperatures within the range 700° to 1000° C; and finally heating the honey comb structure so impregnated for a period within the range 1 to 3 hours in a slightly reducing atmosphere to temperatures within the range 400° to 500° C.

* * * * *